United States Patent [19]
Haugen

[11] Patent Number: 4,982,489
[45] Date of Patent: Jan. 8, 1991

[54] TOOL SET AND METHOD FOR GAUGING AND RESTORING CONCENTRICITY BETWEEN AXIAL SECTIONS OF A WORKPIECE BORE

[75] Inventor: John M. Haugen, Minneapolis, Minn.

[73] Assignee: Honeywell Inc., Minneapolis, Minn.

[21] Appl. No.: 425,544

[22] Filed: Oct. 23, 1989

[51] Int. Cl.$^5$ .............................................. B23B 49/02
[52] U.S. Cl. .................................. 29/402.01; 33/533; 33/645; 33/661; 408/1 R; 408/2; 408/72 B; 408/80
[58] Field of Search ...................... 408/1 R, 2, 14, 15, 408/16, 72 B, 79, 80, 81, 83.5, 241 B; 29/402.01, 406, 407; 33/520, 533, 543, 629, 632, 644, 645, 661

[56] References Cited
U.S. PATENT DOCUMENTS

| | | | |
|---|---|---|---|
| 2,787,196 | 4/1957 | Stadler | 408/83.5 |
| 3,333,487 | 8/1967 | Parry | 408/80 |
| 4,790,079 | 12/1988 | Meyers | 33/533 |

*Primary Examiner*—Daniel W. Howell
*Attorney, Agent, or Firm*—Roger W. Jensen

[57] ABSTRACT

A tool set for gauging and repairing concentricity of a workpiece bore axial section with the pitch diameter of the internal threads in the bore includes a gauge sleeve, a gauge rod, a reamer, and a stop collar. For gauging concentricity of the internal threads with the axial section, the sleeve is first inserted within the bore and threaded into a concentric relationship with the bore internal threads, and, then, the rod is inserted through the sleeve. The rod has an inner end which can extend from the sleeve and within the bore axial section such that the rod inner end will extend through a predetermined distance if the axial section of the bore is concentric with the sleeve and thus with the pitch diameter of the internal threads within the bore. If an eccentric relationship is found to exist between the internal threads and the bore axial section, then, after the rod is withdrawn from the sleeve, the reamer is inserted through the sleeve and rotated to remove material from the workpiece at the axial section unitl a relationship of concentricity is restored between the internal threads and the axial section of the bore. The reamer has an inner end with working elements thereon capable of removing material from the workpiece within the axial section upon rotation of the reamer.

19 Claims, 4 Drawing Sheets

TOOL SET AND METHOD FOR GAUGING AND RESTORING CONCENTRICITY BETWEEN AXIAL SECTIONS OF A WORKPIECE BORE

BACKGROUND OF THE INVENTION

1. Field of the Invention

The present invention generally relates to tools and procedures for machining inspection and, more particularly, is concerned with a tool set and method for gauging and restoring concentricity between axial sections of a workpiece bore, such as a pressure port in a gun tube.

2. Description of the Prior Art

Testing the performance of ammunition involves test firing of the ammunition in a gun tube. Typically, a piezoelectric transducer mounted to the gun tube is used to detect the pressure generated therein by the ammunition. To install the transducer, a bore for providing a pressure-receiving port is fabricated in the gun tube in transverse relation to the axis of the tube. The bore normally contains a section having threads for threadably mounting the transducer within the bore. Fabrication of the bore is carried out by conventional machining operations, such as drilling and tapping the threaded bore.

Accurate machining of the bore is an absolute necessity. A bore having threads which are eccentric with respect to the wall portion of the bore into which the transducer tip extends can damage the transducer and bias the test data if there is preloading contact between the transducer tip and the bore wall portion. Further, the gun tube, which is an expensive component by itself, can be irretrievably lost if the eccentricity of the bore wall portion cannot be repaired. Therefore, to safeguard the equipment and ensure accurate test data it is essential that the bore be correctly machined.

Heretofore, it has been assumed that a tap guided by the drilling spindle of a machine used to drill the bore would follow the drilled bore. There has been no gauge available to measure the degree to which the resulting threads are concentric to the drilled bore. Neither has there been any device for correcting a transducer tip-receiving bore wall portion which is shown to be slightly eccentric.

Consequently, a need exists for equipment and procedures to overcome this deficiency.

SUMMARY OF THE INVENTION

The present invention provides a tool set and method designed to satisfy the aforementioned needs. The tool set and method of the present invention permit gauging the concentricity between axial sections of a machined bore, such as a threaded pressure-receiving port fabricated in a gun tube, and restoring the concentricity of the bore axial sections if found to be eccentric. The tool set and method can reliably detect the existence of eccentricity of internal threads of the bore with a cylindrical wall portion of the bore, can provide a way to rectify marginally eccentric bore portions, and can provide quality assurance of bore concentricity. Specifically, the tool set gauges the degree of concentricity between the bore wall portion and the pitch diameter (as opposed to the minor diameter) of the internal threads of the bore.

Accordingly, the present invention relates to a tool set for gauging a relationship of concentricity between first and second axial sections of a bore formed in a workpiece. The tool set includes (a) a hollow sleeve insertable within the bore into a concentric relationship with the first axial section of the bore; and (b) an elongated rod insertable through the hollow sleeve in a concentric relationship therewith. The rod at an inner end is extendable from the sleeve through a predetermined distance within the second axial section of the bore if the second axial section of the bore is concentric with the rod inner end and thereby with the sleeve and the first axial section of the bore. The first axial section is preferably internal threads in the bore located adjacent the second axial section. The tool set accurately gauges the degree of concentricity between the second axial section of the bore and the pitch diameter of the internal threads of the first axial section of the bore.

Also, the rod has a depth mark thereon for alignment with a preselected location on the sleeve to indicate that the inner end of the rod has been extended the predetermined distance within the second axial section of the bore. Further, the hollow sleeve has a cylindrical body and a wrench head defined on an outer end of the body. Also, the sleeve has external threads on an inner end of the body which are threadable into the internal threads defined at the first axial section of the bore.

Further, the present invention relates to a tool set for restoring a relationship of concentricity between first and second axial sections of a bore formed in a workpiece. The tool set comprises: (a) a hollow sleeve insertable within the bore into a concentric relationship with the first axial section of the bore; (b) an elongated reamer for insertion through the sleeve, the reamer having an inner end with working elements thereon being extendable from the sleeve and capable of removing material from the workpiece within the second axial section of the bore upon rotation of the reamer to restore a relationship of concentricity between the first and second axial sections thereof; and (c) means attached to the reamer and spaced from the inner end thereof for limiting insertion of the reamer through the sleeve. The limiting means is a stop collar inserted over the reamer and attached thereon. The reamer also has wrenching means on an opposite end for gripping to rotate the reamer.

Also, the present invention is directed to a method for gauging and restoring a relationship of concentricity between first and second axial sections of a bore formed in a workpiece. The gauging and restoring method comprises the steps of: (a) inserting a hollow gauge sleeve within the bore and into a concentric relationship with the first axial section thereof; (b) inserting a gauge rod through the sleeve to attempt to extend an inner end of the rod from the sleeve through a predetermined distance within the second axial section of the bore such that (i) if the inner end of the rod can be extended through the predetermined distance within the second axial section of the bore, then the second axial section of the bore is concentric with the sleeve and thus with the first axial section of the bore, whereas (ii) if the inner end of the rod cannot be extended through the predetermined distance within the second axial section of the bore, then an eccentric relationship is found to exist between the first and second axial sections of the bore; (c) withdrawing the rod from the sleeve and, if the concentric relationship was found to exist between the first and second axial sections of the bore, then discontinuing further operations; (d) withdrawing the rod from the sleeve and, if the eccentric relationship was found to exist between the first and second axial sections of the bore, then inserting a reamer through the sleeve and rotating the reamer to remove material from the workpiece at the second axial section of the bore until a relationship of concentricity is restored between the first and second axial sections of the bore; and (e) after the relationship of concentricity is restored, withdrawing the reamer from the sleeve and discontinuing further operations.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
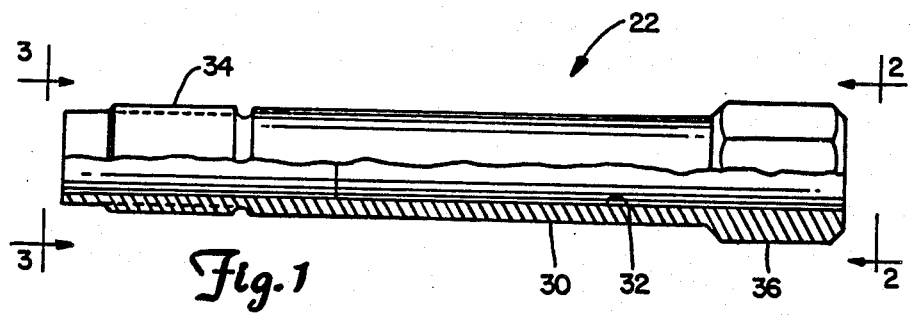
FIG. 1 is a side elevational view, with parts broken away and sectioned, of a gauge sleeve of a tool set of the present invention.

Referring to the drawings, and particularly to FIGS. 1-10, there is shown the components of a tool set of the present invention. The tool set can be used in accordance with the method of the present invention for gauging and restoring a relationship of concentricity between first and second axial sections of a machined bore in a workpiece. Referring to FIGS. 11-14, by way of example, the workpiece 10 is a gun tube and the bore 12 is a pressure port machined in the gun tube. The first axial section 14 is a series of internal threads on the gun tube 10 within a middle portion 12A of the pressure port 12 and disposed remote from an exterior cylindrical surface 16 of the gun tube 10. The second axial section is an inner portion 12B of the pressure port 12 extending between the internal threads 14 at the middle portion 12A of the port 12 and an interior cylindrical surface 20 of the gun tube 10. The inner port portion 12B is smaller in diameter than the middle port portion 12A. Thus, the tool set is used to accurately gauge the degree of concentricity between the second axial section or inner port portion 12B of the port 12 and the internal threads 14 of the first axial section of the port 12, that is, the degree of concentricity between the inner port portion 12B and the pitch diameter of the internal threads 14.

Figure 3:
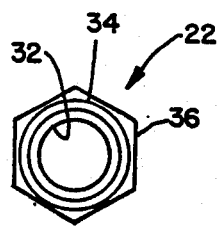
FIG. 3 is another enlarged end elevational view of the gauge sleeve as seen along line 3—3 of FIG. 1.
Figure 2:
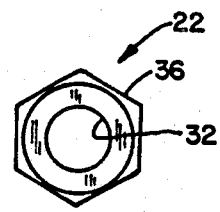
FIG. 2 is one enlarged end elevational view of the gauge sleeve as seen along line 2—2 of FIG. 1.
Figure 8:
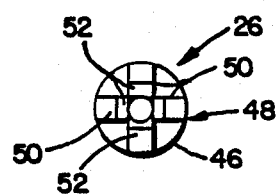
FIG. 8 is another enlarged end elevational view of the reamer as seen along line 8—8 of FIG. 6.
Figure 9:
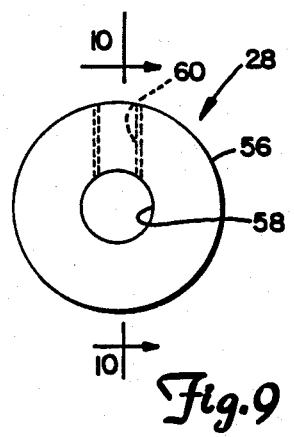
FIG. 9 is an end elevational view of a stop collar of the tool set of the present invention.
Figure 10:
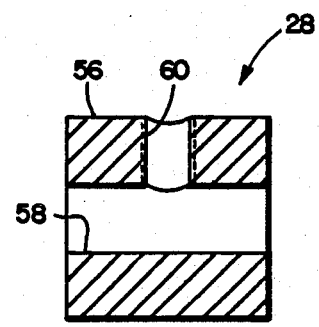
FIG. 10 is an axial sectional view of the stop collar taken along line 10—10 of FIG. 9.

In its basic components, the tool set includes a hollow gauge sleeve 22 (FIGS. 1-3), an elongated gauge rod 24 (FIGS. 4-5), an elongated reamer 26 (FIGS. 6-8), and an adjustable stop collar 28 (FIGS. 9-10). Referring to FIGS. 1-3, the gauge sleeve 22 of the tool set is composed of a hollow cylindrical body 30 with a central cylindrical passage 32 and having a series of external threads 34 formed on an inner end of the body 30 and a wrench head 36 formed on an outer end of the body 30. The outside diameter of the gauge sleeve 22 is smaller than the diameter of an outer portion 12C of the pressure port 12 making the gauge sleeve 22 readily insertable within the outer port portion 12C. The outer port portion 12C is larger in diameter than the middle port portion 12A which has the internal threads 14.

Figure 11:
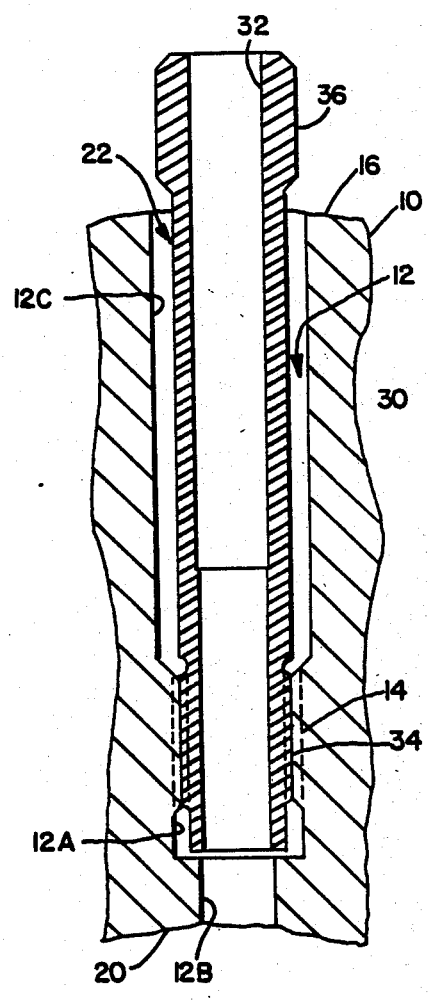
FIGS. 11-14 are a series of views depicting the operational steps of the method of the present invention for gauging and restoring a relationship of concentricity between first and second axial sections of a machined bore.

The external threads 34 on the inner end of the body 30 of the gauge sleeve 22 are matched in diameter with the internal threads 14 on the middle portion 12A of the bore 12 such that when the gauge sleeve 22 is inserted into the bore 12, as seen in FIG. 11, the external threads 34 on the gauge sleeve body 30 are threadable into a concentric relationship with the internal threads 14. The wrench head 36 can be gripped by a suitable tool for rotating the gauge sleeve body 30 to effect threading of the external threads 34 thereon into the internal threads 14 of the bore 12.

Figure 4:
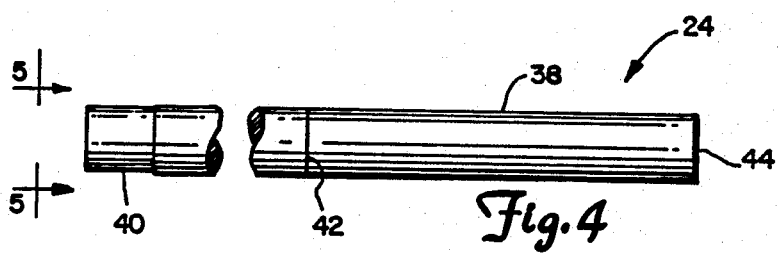
FIG. 4 is a foreshortened side elevational view of a gauge rod of the tool set of the present invention.
Figure 5:
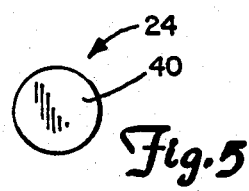
FIG. 5 is an enlarged end elevational view of the gauge rod as seen along line 5—5 of FIG. 4.

Referring to FIGS. 4-5, the gauge rod 24 of the tool set is composed of an elongated cylindrical body 38 having an outside diameter slightly smaller than the diameter of the central passage 32 of the gauge sleeve body 30 which permits close fitting insertion of the gauge rod 24 through the passage 32 of the gauge sleeve 22 in a concentric relationship therewith for enabling the gauge rod 24 to be used for gauging the concentricity between the pitch diameter of the internal threads 14 and the inner portion 12B of the bore 12. More particularly, the gauge rod 24 has an inner end 40 the outside diameter of which is slightly smaller than the diameter of the inner bore portion 12B, permitting the inner rod end 40 to slidably fit within the inner bore portion 12B if the inner bore portion 12B is in a concentric relationship with the sleeve passage 32.

Figure 12:
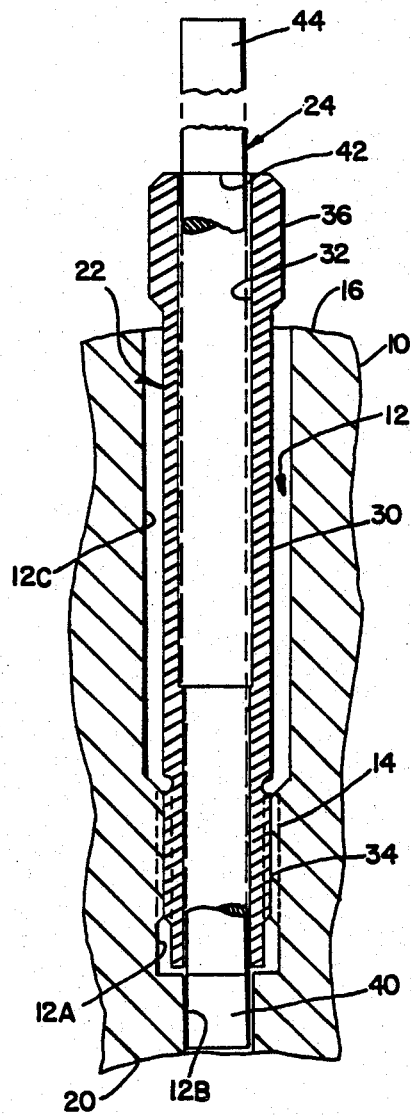

Thus, when the gauge rod 24 is inserted through the sleeve passage 32, as seen in FIG. 12, the inner rod end 40 can be extended from the sleeve passage 32 at the inner end 22A of the gauge sleeve 22 through a predetermined distance within the inner portion 12B of the bore 12 if the inner bore portion 12B is concentric with the gauge sleeve 22 and thus the internal threads 14 of the bore 12. The gauge rod 24 has a depth mark 42 imprinted thereon spaced from an outer end 44 thereof which when aligned with a preselected location on the gauge sleeve 22, such as the outer end 22B thereof, indicates that the inner end 40 of the gauge rod 24 has extended the predetermined distance within the inner portion 12B of the bore 12, signifying that the concentricity relationship exists between the pitch diameter of the internal threads 14 and inner portion 12B of the bore 12. On the other hand, if the inner rod end 40 contacts the sidewall of the inner bore portion 12B before traveling through the desired predetermined distance, as seen in FIG. 13, then an eccentric relationship is found to exist between the inner bore portion 12B and the sleeve passage 32 and thus also with the internal threads 14 of the bore 12.

Figure 6:
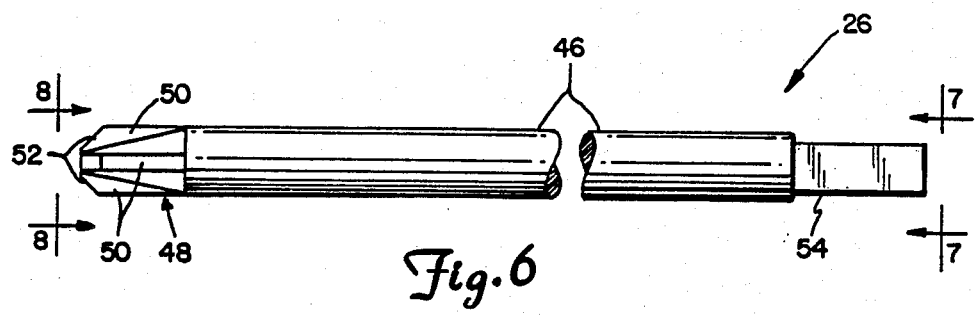
FIG. 6 is a foreshortened side elevational view of a reamer of the tool set of the present invention.
Figure 7:
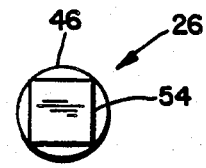
FIG. 7 is one enlarged end elevational view of the reamer as seen along line 7—7 of FIG. 6.

Referring to FIGS. 6-8, the reamer 26 of the tool set is composed of an elongated cylindrical body 46 having an outside diameter slightly smaller than the diameter of the central passage 32 of the gauge sleeve body 30 which permits close fitting insertion of the reamer 26 through the passage 32 of the gauge sleeve 22 in a concentric relationship therewith for enabling the reamer 26 to be used for restoring a relationship of concentricity between the internal threads 14 and the inner portion 12B of the bore 12. More particularly, the reamer 26 has an inner end 48 with working elements thereon in the form of circumferentially spaced and axially extending flutes 50 having beveled cutting edges 52 thereon. The reamer 26 also has wrenching means in the form of a square shank 54 on its opposite end for gripping by another tool, such as a T-handle, to use in rotating the reamer 26.

Figures 13, 14:
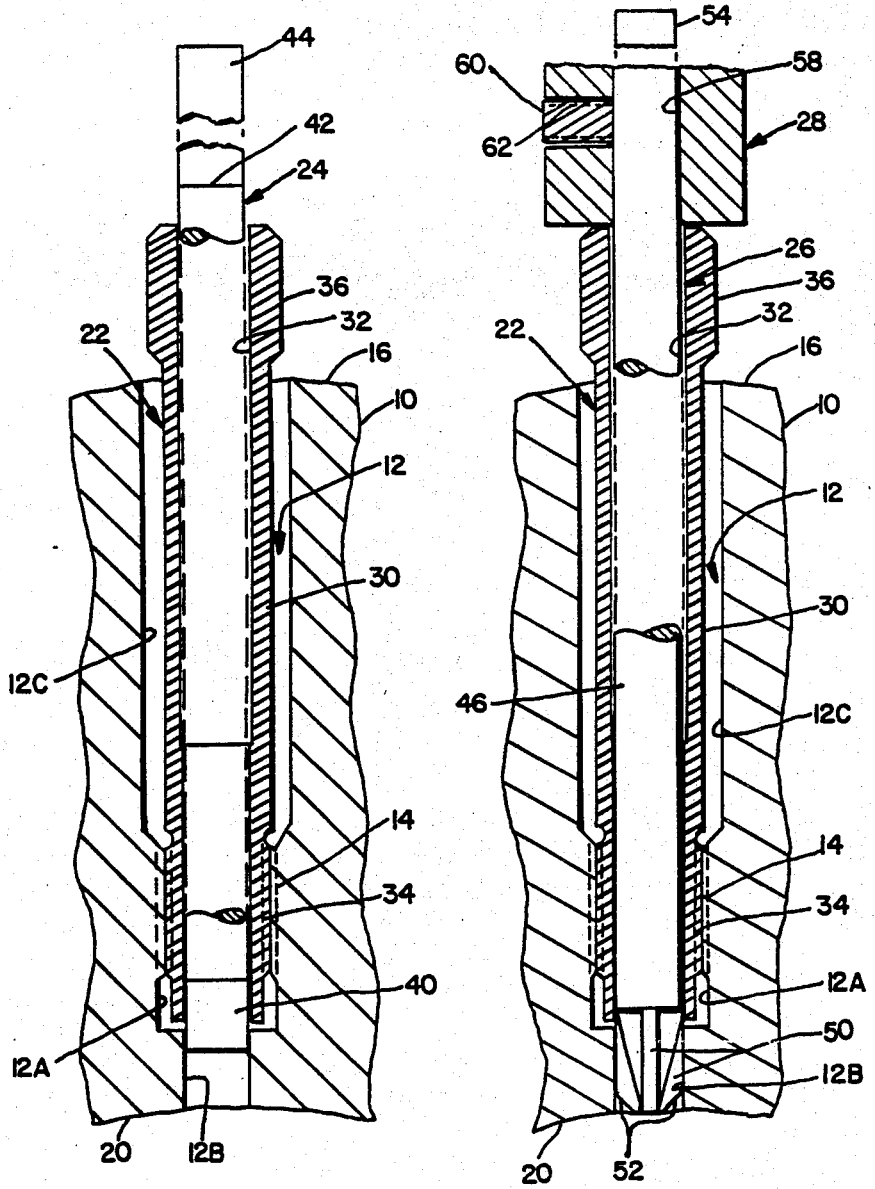

Upon insertion of the reamer 26 into the gauge sleeve passage 32 so as to place the inner reamer end 48 at the mouth of the inner bore portion 12B, as shown in FIG. 14, the cutting edges 52 on the inner reamer end 48 will engage the sidewall of the inner bore portion 12B and remove material from the gun tube 10 about the inner bore portion 12B upon rotation of the reamer 26. Such action by the reamer 26 will soon restore a relationship of concentricity between the internal threads 14 and the inner portion 12B of the bore 12.

Referring to FIGS. 9-10, the stop collar 28 of the tool set is a hollow cylindrical body 56 having a central opening 58 for inserting it over and sliding it along the body 46 of the reamer 26. The collar body 56 also contains a transverse hole 60 which receives a set screw 62 (FIG. 14) for anchoring the collar 28 to the reamer body 46. The collar 28 is attached to the reamer 26 at a location thereon spaced from its inner end 48 which limits the depth to which the reamer 26 can be inserted through the sleeve 22 and into the inner bore portion 12B. Thus, once the collar 28 bottoms against the outer end 22B of the sleeve 22, the user then knows that reaming out of the inner bore portion 12B is completed.

In FIGS. 11-14, the above-described components of the tool set are illustrated at the successive operational steps of the method of the present invention for gauging and restoring the relationship of concentricity between the pitch diameter of the internal threads 14 and the inner portion 12B of the machined bore 12. As shown in FIG. 11, the first step involves inserting the gauge sleeve 22 within the outer portion 12C of the bore 12 and threading the external threads 34 on the sleeve body 30 into the internal threads 14 of the middle portion 12A of the bore 12 to provide the sleeve 22 in a concentric relationship with the internal threads 14 of the bore 12.

FIG. 12 illustrates the next step wherein the gauge rod 24 is inserted through the gauge sleeve passage 32 and its inner end 40 is extended from the inner end 22A of the sleeve 22 through the desired predetermined distance within the inner bore portion 12B. The projection of the inner rod end 40 into the inner bore portion 12B through the desired predetermined distance means that a concentric relationship exists between the inner portion 12B and the pitch diameter of the internal threads 14 of the bore 12. At this point, gauging of concentricity is completed and the gauge rod 24 is merely withdrawn and the sleeve 22 is removed.

FIG. 13 illustrates the alternative situation where the inner end 40 of the gauge rod 24 cannot extend through the predetermined distance into the inner bore portion 12B because of the existence of an eccentric relationship between the internal threads 14 and the inner portion 12B of the bore 12. In view of this situation, the gauge rod 24 is then removed and the next step is undertaken to remove the interfering material and restore the concentric relationship.

FIG. 14 illustrates the final step wherein the reamer 26 with the stop collar 28 attached thereon is inserted through the gauge sleeve passage 32 and then rotated to remove the interfering material from the inner bore portion 12B. The insertion and rotation of the reamer 26 continues until the stop collar 28 bottoms against the outer end 22B of the sleeve 22 signifying that a relationship of concentricity has now been restored between the internal threads 14 and the inner portion 12B of the bore 12. After the relationship of concentricity is restored, the reamer 26 and the sleeve 22 are withdrawn and further operations are discontinued.

Confirmation of the existence of a concentric relationship between the internal threads 14 and the inner portion 12B of the bore or pressure port 12 thus ensures that no contact will occur between the sidewall of the inner bore portion 12B and the detecting end of the measuring transducer (not shown) when installed in the bore 12. Assurance is thereby provided that accurate test data will be recorded at the pressure port 12.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A tool set for gauging a relationship of concentricity between first and second axial sections of a bore formed in a workpiece, said tool set comprising:
   (a) a hollow sleeve insertable within the bore into a concentric relationship with the first axial section of the bore; and
   (b) an elongated rod insertable through said sleeve in a concentric relationship therewith, said rod at an inner end thereof being extendable from said sleeve through a predetermined distance within the second axial section of the bore if the second axial section of the bore is concentric with said rod inner end and thereby with said sleeve and the first axial section of the bore.

2. The tool set of claim 1 wherein said rod also has a depth mark thereon for alignment with a preselected location on said sleeve to indicate that said inner end of said rod has been extended the predetermined distance within the second axial section of the bore.

3. The tool set of claim 1 wherein said sleeve has a cylindrical body and a wrench head defined on an outer end of said body.

4. The tool set of claim 1 wherein said sleeve has a cylindrical body and external threads defined on an inner end of said body which are threadable into internal threads defined at the first axial section of the bore such that the degree of concentricity can be gauged between the pitch diameter of the internal threads and the second axial section of the bore.

5. A tool set for restoring a relationship of concentricity between first and second axial sections of a bore formed in a workpiece, said tool set comprising:
(a) a hollow sleeve insertable within the bore into a concentric relationship with the first axial section of the bore;
(b) an elongated reamer for insertion through said sleeve, said reamer having an inner end with working elements thereon being extendable from said sleeve and capable of removing material from the workpiece within the second axial section of the bore upon rotation of the reamer to restore a relationship of concentricity between the first and second axial sections thereof; and
(c) means attached to said reamer and spaced from said inner end thereof for limiting insertion of said reamer through said sleeve.

6. The tool set of claim 5 wherein said limiting means is a hollow stop collar inserted over said reamer and attached thereon.

7. The tool set of claim 5 wherein said reamer also has wrenching means on an opposite end for gripping to rotate said reamer.

8. The tool set of claim 5 wherein said sleeve has a cylindrical body and a wrench head defined on an outer end of said body.

9. The tool set of claim 5 wherein said sleeve has a cylindrical body and external threads defined on an inner end of said body which are threadable into internal threads defined on the first axial section of the bore such that the degree of concentricity can be gauged between the pitch diameter of the internal threads and the second axial section of the bore.

10. A tool set for gauging and restoring a relationship of concentricity between first and second axial sections of a bore formed in a workpiece, said tool set comprising:
(a) a hollow sleeve insertable within the bore and into a concentric relationship with the first axial section of the bore;
(b) an elongated rod insertable through said sleeve, said rod having an inner end extendable from said sleeve through a predetermined distance within the second axial section of the bore if the second axial section of the bore is concentric with said rod inner end and thereby with said sleeve and the first axial section of the bore;
(c) an elongated reamer for insertion through said sleeve, said reamer having an inner end with working elements thereon being extendable from said sleeve and capable of removing material from the workpiece within the second axial section of the bore upon rotation of the reamer to restore a relationship of concentricity between the first and second axial sections thereof; and
(d) means attached to said reamer and spaced from said inner end thereof for limiting insertion of said reamer through said sleeve.

11. The tool set of claim 10 wherein said sleeve has a cylindrical body and a wrench head defined on an outer end of said body.

12. The tool set of claim 10 wherein said sleeve has a cylindrical body and external threads on an inner end of said body which are threadable into internal threads defined on the first axial section of the bore such that the degree of concentricity can be gauged between the pitch diameter of the internal threads and the second axial section of the bore.

13. The tool set of claim 10 wherein said rod also has a depth mark thereon for alignment with a preselected location on said sleeve to indicate that said inner end of said rod has been extended the predetermined distance within the second axial section of the bore.

14. The tool set of claim 10 wherein said limiting means is a hollow stop collar inserted over said reamer and attached thereon.

15. The tool set of claim 10 wherein said reamer also has wrenching means on an opposite end for gripping to rotate said reamer.

16. A method for gauging a relationship of concentricity between first and second axial sections of a bore formed in a workpiece, comprising the steps of:
(a) inserting a hollow gauge sleeve within the bore and into a concentric relationship with the first axial section thereof;
(b) inserting a gauge rod through the sleeve in concentric relationship therewith to attempt to extend an inner end of the rod from the sleeve through a predetermined distance within the second axial section of the bore such that (i) if the inner end of the rod can be extended through the predetermined distance within the second axial section of the bore, then a concentric relationship is found to exist between the second axial section of the bore and the sleeve and thus between the first and second axial sections of the bore, whereas (ii) if the inner end of the rod cannot be extended through the predetermined distance within the second axial section of the bore, then an eccentric relationship is found to exist between the first and second axial sections of the bore.

17. A method for restoring a relationship of concentricity between first and second axial sections of a bore formed in a workpiece, comprising the steps of:
(a) inserting a hollow gauge sleeve within the bore and into a concentric relationship with the first axial section thereof;
(b) inserting a reamer through the sleeve in concentric relationship therewith and into contact with the workpiece at the second axial section of the bore; and
(c) rotating the reamer to remove material from the workpiece at the second axial section of the bore until a relationship of concentricity is restored between the first and second axial sections of the bore.

18. A method for gauging and restoring a relationship of concentricity between first and second axial sections of a bore formed in a workpiece, comprising the steps of:
(a) inserting a hollow gauge sleeve within the bore and into a concentric relationship with the first axial section thereof;
(b) inserting a gauge rod through the sleeve to attempt to extend an inner end of the rod from the sleeve through a predetermined distance within the second axial section of the bore such that (i) if the inner end of the rod can be extended through the predetermined distance within the second axial section of the bore, then a concentric relationship is found to exist between the second axial section of the bore and the sleeve and thus between the first and second axial sections of the bore, whereas (ii) if the inner end of the rod cannot be extended through the predetermined distance within the second axial section of the bore, then an eccentric relationship is found to exist between the first and second axial sections of the bore;

(c) withdrawing the rod from the sleeve and, if the concentric relationship was found to exist between the first and second axial sections of the bore, then discontinuing further operations; and (d) withdrawing the rod from the sleeve and, if the eccentric relationship was found to exist between the first and second axial sections of the bore, then inserting a reamer through the sleeve and rotating the reamer to remove material from the workpiece at the second axial section of the bore until a relationship of concentricity is restored between the first and second axial sections of the bore.

19. The method of claim 18 further comprising:

(e) after the relationship of concentricity is restored, withdrawing the reamer from the sleeve and discontinuing further operations.

* * * * *